US007444965B2

(12) United States Patent
Frehland

(10) Patent No.: US 7,444,965 B2
(45) Date of Patent: Nov. 4, 2008

(54) CONTROL DEVICE FOR SUPERCHARGED INTERNAL COMBUSTION ENGINES COMPRISING A SYSTEM FOR ADJUSTING THE CONTROL TIMES OF AN INLET VALVE

(75) Inventor: Peter Frehland, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/638,419

(22) Filed: Dec. 14, 2006

(65) Prior Publication Data
US 2007/0119399 A1 May 31, 2007

Related U.S. Application Data

(63) Continuation of application No. PCT/EP2005/006410, filed on Jun. 15, 2005.

(30) Foreign Application Priority Data
Jun. 16, 2004 (DE) .................... 10 2004 028 972

(51) Int. Cl.
F01L 1/34 (2006.01)
(52) U.S. Cl. .................. 123/90.15; 123/90.17; 123/346
(58) Field of Classification Search .............. 123/90.15, 123/90.16, 90.17, 90.18, 90.27, 90.31, 345, 123/346, 347, 348
See application file for complete search history.

(56) References Cited

U.S. PATENT DOCUMENTS
5,421,308 A 6/1995 Hitomi et al.
6,460,337 B1 10/2002 Olofsson

FOREIGN PATENT DOCUMENTS

| CH | 318 281 A | 12/1956 |
| DE | 29 42 326 A1 | 4/1981 |
| DE | 43 12 085 A1 | 10/1993 |
| EP | 1 318 286 A2 | 6/2003 |
| GB | 746800 A | 3/1956 |
| JP | 08296469 A | * 11/1996 |

OTHER PUBLICATIONS

Bosch "Sutoelektrik, Autoelektronik am Ottomoto" [Automotive Electric Systems, Automotive Electronics In the Gasoline Engine], $2^{nd}$ edition, 1994, VDI Verlag, Duesseldorf, pp. 7 and 8 and pp. 246 and 247.
International Search Report with English translation thereof dated Sep. 26, 2005 (Six (6) Pages).
German Office Action with English translation thereof dated Jul. 1, 2005 (Seven (7) Pages).

* cited by examiner

Primary Examiner—Ching Chang
(74) Attorney, Agent, or Firm—Crowell & Moring LLP

(57) ABSTRACT

An internal combustion engine having a supercharger system and a system for adjusting the control times of at least one intake valve of a cylinder within a predefined adjustment range, in which the control times are adjustable between starting from a zero position up to a maximum adjustment position, adjusting it by a defined maximum possible crank angle range in the direction of advanced ignition, and the intake length of the intake cam assigned to the intake valve is designed so that the control time for closing the intake valve is at or before bottom dead center when the zero position prevails in the system for adjusting the control times.

4 Claims, 1 Drawing Sheet

CONTROL DEVICE FOR SUPERCHARGED INTERNAL COMBUSTION ENGINES COMPRISING A SYSTEM FOR ADJUSTING THE CONTROL TIMES OF AN INLET VALVE

This application is a Continuation of PCT/EP2005/006410, filed Jun. 15, 2005, and claims the priority of German Patent Application No. 10 2004 028 972.7, filed Jun. 16, 2004, the disclosures of which are expressly incorporated by reference herein.

BACKGROUND AND SUMMARY OF THE INVENTION

This invention relates to a control device for internal combustion engines having a supercharger system and an adjustable intake valve system.

Such a control device is known from German patent document DE 43 12 085 A1, for example. This known control device is concerned with adjusting an optimum valve overlap as a function of load and rotational speed of the internal combustion engine specifically in supercharged internal combustion engines. Only the control time for opening is taken into account, but the control time for closing the intake valve is not. The control device described here addresses the problem that in the case of valve overlap, unburned fuel can be blown through the cylinder by the supercharger system, the so-called blow-by effect.

Other known control devices devoted to the adjustment of optimum valve overlap disregard the problem that in the lower partial load range, residual gases may flow into the cylinder due to the negative flushing gradient, these gases initially contributing to dethrottling of the charge cycle but above a certain level they are capable of preventing stable combustion.

The object of the invention is to improve upon a control device of the type defined in the introduction, so that fuel consumption is reduced, at least in the partial load range, while excessive valve overlap is prevented.

According to this invention, fuel consumption is reduced especially in the partial load range by dethrottling with early intake valve closure while at the same time preventing excessive valve overlap without any change in the total intake control time. The subject matter of the invention is the application of a fixed reduced intake control time with a supercharger system. According to this invention, preferably a system having an exhaust turbocharger or compressor supercharger is used as the supercharger system.

With the inventive control device for internal combustion engines having a supercharger system and a system for adjusting the control times of at least one intake valve of a cylinder within a predetermined adjustment range, starting from a zero position up to a maximum adjustment position, adjusting it by a defined maximum possible crank angle range in the direction of advanced ignition, the intake length of the intake cam assigned to the intake valve is designed so that the control time for closing the intake valve is at or before the crank angle (° CA) assigned to bottom dead center (BDC) of the charge cycle of the cylinder piston when the zero position prevails with the system for adjusting the control times. Systems for adjusting the control times by rotation of the camshaft in particular have also long been known by the abbreviation VANOS.

The zero position here corresponds to the greatest intake spread, i.e., the maximum adjustment position in the direction of delayed ignition. The intake length is usually defined in relation to a predetermined opening and closing valve lift of somewhat more than 0 mm, here preferably 1 mm opening and closing lift, so the asymptotic starting and ending curves of a valve lift diagram are "truncated" with regard to a sharper curve.

The intake length of the intake cam assigned to the intake valve is preferably designed so that the control time for closing the intake valve occurs before the crank angle assigned to bottom dead center of the charge cycle of the cylinder piston when the maximum adjustment position occurs in the system for adjusting the control times by the total adjustment range in the direction of advanced ignition.

In addition, the intake length of the intake cam assigned to the intake valve is additionally designed so that at a maximum possible adjustment of the control times in the direction of advanced ignition for dethrottling of the charge cycle procedure due to early intake closing time, a predetermined maximum allowed valve overlap is not exceeded.

On the whole, the inventive intake length, i.e., the effective intake control time (beyond an opening and closing height of the intake valve of approximately 1 mm) of the intake cam assigned to the intake valve is preferably between a crank angle of approximately 150° and a crank angle of approximately 190°.

The invention is based on the finding that the intake volume is limited by shifting the intake closing in the direction of advanced ignition, preferably by the amount of the full VANOS adjustment range, which is known to be CA 60° to CA 70°, for example, with regard to bottom dead center in the intake cycle during the charge cycle. This yields fuel savings. The inventive approach here involves only using a "shorter" cam (intake length above 1 mm valve lift <190° crank angle (° CA)) in comparison with the cams generally used (intake length above 1 mm valve lift >200°). This is possible because the disadvantage of the short intake camshaft control time with regard an adequate volume of fresh air for combustion can be compensated because of the increased supercharging pressure of the supercharger system. For this invention, no complex additional systems for adjusting the control times, such as systems for camshaft shifting (e.g., VVT) or fully variable valve controls (e.g., EVT), are required.

The invention is also based on the finding that merely shifting the intake closing forward alone is not sufficient but instead excessive valve overlap must also be avoided through the inventive shortening of the intake length, because otherwise an excessive amount of residual gas could have a negative effect on combustion.

Other objects, advantages and novel features of the present invention will become apparent from the following detailed description of the invention when considered in conjunction with the accompanying drawings.

DETAILED DESCRIPTION

Figure 1:
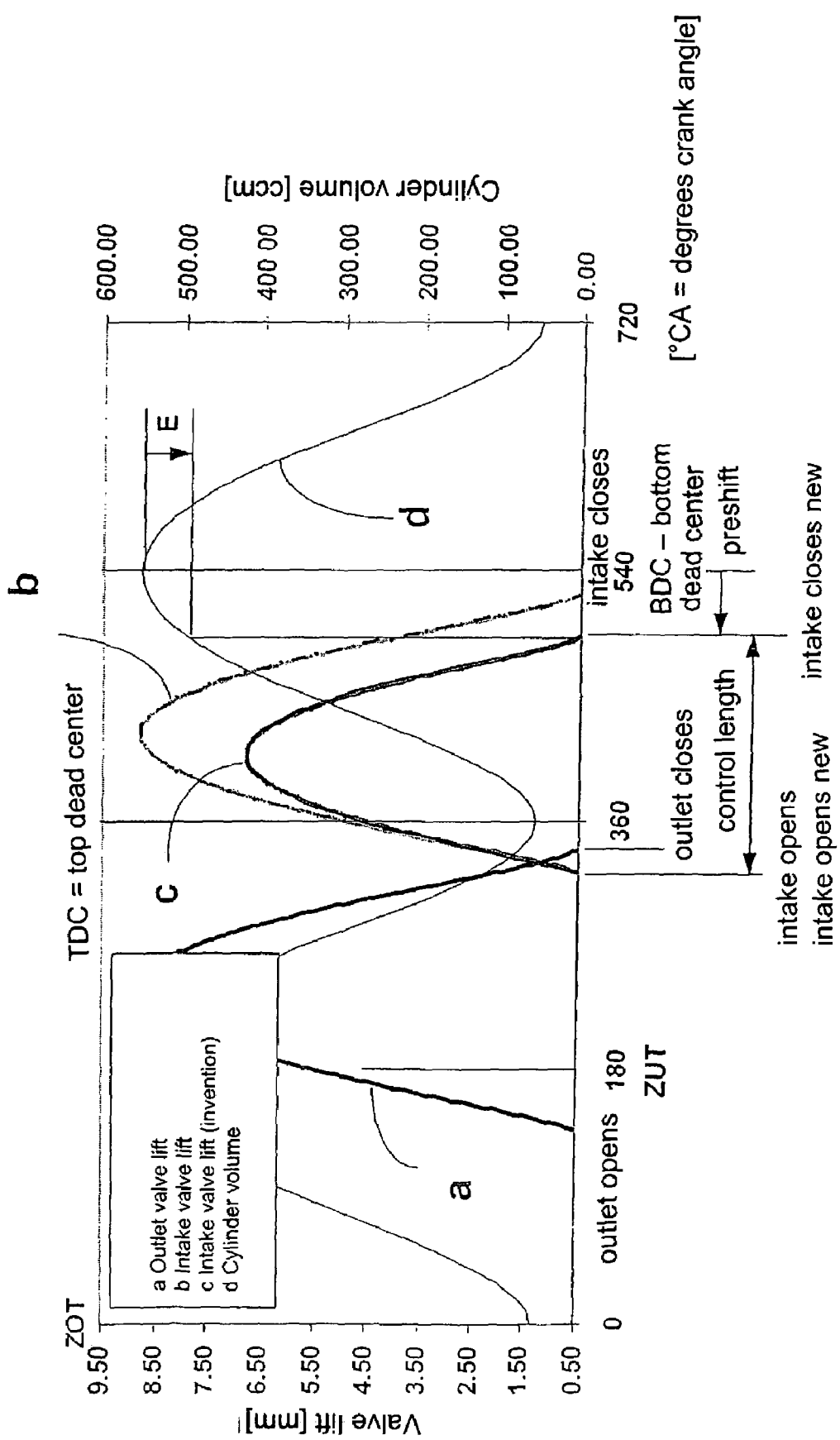
FIG. 1 illustrates valve lift and timing control in accordance with an exemplary embodiment of the invention.

The single FIG. 1 shows the control times (AÖ=outlet opens, AS=outlet closes) for an outlet valve (outlet valve control diagram or outlet valve lift diagram a), whose control times may, but need not, also be adjustable, the usual control times (EÖ=intake opens, ES=intake closes) for an intake value (intake valve control diagram or intake valve lift diagram b according to the state of the art) and the inventive control times (EÖ$_{new}$=intake opens, ES$_{new}$=intake closes, new) for an intake valve based on the inventive design of the respective intake cam (intake valve control diagram or intake valve lift diagram c according to the invention). The intake valve control diagram c is shown for the maximum adjustment position of the system for adjusting the control times in the direction of advanced ignition. At a high load demand, for example, the control time for the intake closing may also be adjusted temporarily in the direction of delayed ignition at bottom dead center (BDC) of the charge cycle (zero position here) by the system for adjusting the control times. But in comparison with the state of the art (intake valve control diagram b), there is fundamentally a preshift V of the intake closing, preferably by the entire adjustment range because of the "shorter" cam dimension. A considerable dethrottling E may be achieved in this way, as can be seen by curve d of the intake volume in the cylinder. Valve overlap is defined by the crank angle range at which the outlet valve and intake valve are open at the same time (i.e., between EÖ and AS).

With regard to the technical background from the standpoint of the functioning of adjustable valve control times, reference is additionally made to the textbook "Autoelektrik, Autoelektronik am Ottomotor" [Automotive Electric Systems, Automotive Electronics in the Gasoline Engine] by Bosch, $2^{nd}$ edition, 1994, VDI Verlag, Düsseldorf, pages 7 and 8 and pages 246 and 247. It can also be seen from the valve control diagrams shown here that according to the state of the art, even with full adjustment of the control times in the direction of advanced ignition, intake closing always takes place after bottom dead center of the charge cycle. According to the subject matter of the present invention, however, intake closing preferably takes place before or "at the latest" at bottom dead center of the charge cycle.

A cost-neutral approach for reducing fuel consumption is made available through the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for an internal combustion engine having a supercharger system and a system for adjusting control times of at least one intake valve of a cylinder of said engine, said control times of the at least one intake valve being adjustable within a predefined adjustment range starting from a zero position up to a predefined maximum adjustment position in the direction of advanced ignition, wherein
   when the zero position prevails in the system for adjusting the control times, a intake length of an intake cam assigned to the at least one intake valve is arranged such that a control time for closing the at least one intake valve occurs at or before a bottom dead center crank angle of the cylinder of the at least one intake valve, and
   the intake length of the intake cam assigned to the at least one intake valve is between a crank angle of approximately 150° and a crank angle of approximately 190° from a 1 mm opening lift to a 1 mm closing lift.

2. The control device as claimed in claim 1, wherein when the predefined maximum adjustment position prevails in the system for adjusting the control times, the intake length of the intake cam assigned to the at least one intake valve is arranged such that the control time for closing the at least one intake valve occurs before a bottom dead center of the crank angle of the cylinder of the at least one intake valve.

3. The control device as claimed in claim 1, wherein the intake length of the intake cam assigned to the at least one intake valve is additionally arranged so that a predetermined maximum allowed valve overlap is not exceeded at the predefined maximum adjustment position of the control times in the direction of advanced ignition.

4. The control device as claimed in claim 2, wherein the intake length of the intake cam assigned to the at least one intake valve is additionally arranged so that a predetermined maximum allowed valve overlap is not exceeded at the predefined maximum adjustment position of the control times in the direction of advanced ignition.

* * * * *